United States Patent [19]

Tezuka

[11] 4,437,826

[45] Mar. 20, 1984

[54] RICE-BODY SHAPING DEVICE FOR ROLLED SUSHI

[76] Inventor: Akitomi Tezuka, 5-11, Kinuta 3-chome, Setagaya-Ku, Tokyo, Japan

[21] Appl. No.: 403,532

[22] Filed: Jul. 30, 1982

[51] Int. Cl.³ .......................... B29C 1/00; B29D 3/00
[52] U.S. Cl. ..................... 425/182; 249/92; 249/120; 249/121; 425/193; 425/358; 425/408; 425/412
[58] Field of Search ............... 249/121, 123, 120, 119, 249/184; 99/439, 440, 353, 460, 458, 465; 425/318, 412, 469, 357, 84, 116, 117, 408, 406, 410, 358, 182, 183, 193

[56] References Cited

U.S. PATENT DOCUMENTS

| 454,873 | 6/1891 | Lawrence | 425/357 |
|---|---|---|---|
| 937,105 | 10/1909 | Simons | 425/412 |
| 986,701 | 3/1911 | Frerichs | 425/412 |
| 996,449 | 6/1911 | Bodenstein | 425/318 |
| 2,515,952 | 7/1950 | Doyle | 425/469 |
| 2,554,734 | 5/1951 | Gehm | 425/469 |
| 3,838,955 | 10/1974 | Dubbeld | 425/84 |

Primary Examiner—Willard E. Hoag
Attorney, Agent, or Firm—McGlew and Tuttle

[57] ABSTRACT

The present invention concerns a device for shaping and forming a rice body for a rolled sushi dish. The device comprises a base member provided with a plurality of semi-cylindrical notches in a parallel arrangement, a push cover member constructed in a similar but symmetrical form to the base member, a cylindrical frame member of the size into which the above two members can be horizontally inserted, and a ram member of the size engageable with inside of the frame and provided on the lower side thereof with plural projections in a parallel arrangement. The device is used by inserting the base member having plural semi-cylindrical notches from below into the frame for engagement, placing a suitable amount of vinegared rice (sushi-meshi) into the cylindrical frame, fitting the ram member from above into the frame to make a dent upon the surface of the vinegared rice, placing such suitable ingredients as pieces of tuna, ham, cucumber, etc. on the dents of the rice, then placing vinegared rice again thereon and pressing the push cover thereon to form and shape sushi rolls of a cylindrical form. Immediately before serving such rolled sushi, it is wrapped with a sheet of roasted seaweed to complete the dish. If it is sold over the counter as a take-out meal, the sushi roll is separated from the sheet of roasted seaweed with such water repellent materials as a thick vinyl sheet in order to prevent the crisp seaweed sheet from getting moist from the rolled rice. When served, the seaweed is taken out from the vinyl wrapper and is used to wrap around the rolled sushi.

2 Claims, 9 Drawing Figures

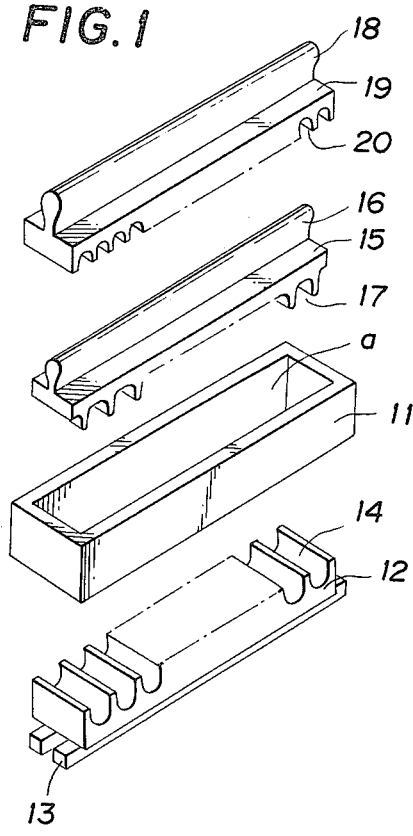
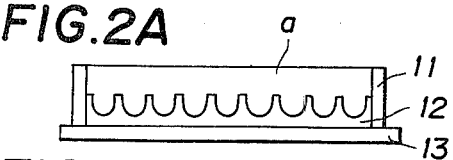
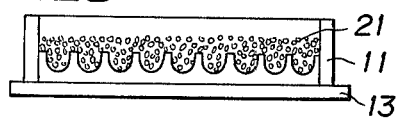
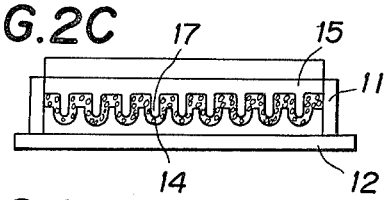
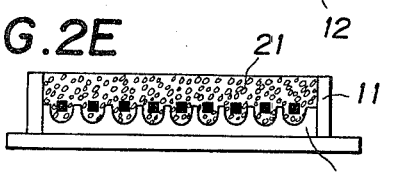
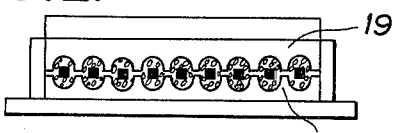
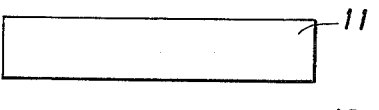
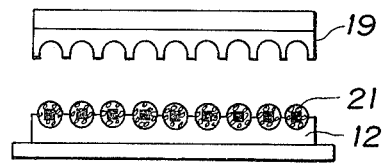
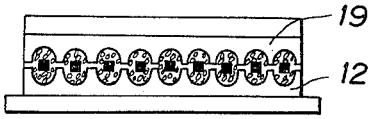

RICE-BODY SHAPING DEVICE FOR ROLLED SUSHI

BACKGROUND OF THE INVENTION

Field of the Invention

Sushi rolls are rolled up in prior art by spreading out a makisu, a bamboo mat comprising fine bamboo sticks flexibly braided with thread, spreading a sheet of roasted seaweed, placing a levelling vinegared rice thereon, placing such ingredients as a piece of tuna, ham and cucumber, etc., and rolling up the whole by rolling the underlayed bamboo sheet with a uniform force applied thereon. The conventional method requires not only time and labour, but sufficient experience to know the proper degree of force to apply for rolling and the proper amount of vinegared rice to form a roll. Unless one had proper training, it was extremely difficult to shape a sushi roll of a given size, and a form with a desirable hardness not to collapse. It was particularly difficult to make presentable sushi rolls which could pass as the professional art.

SUMMARY OF THE INVENTION

The present invention aims to provide a device which is capable of forming rolls of vinegared steamed rice in a large number without trouble to know proper degree of the force, etc.. The present invention further aims to provide advice to shape a mass of vinegared rice of a predetermined size and shape for sushi rolls.

Other objects, features and advantages of the present invention will become apparent from the ensuing description taken in conjunction with the accompanying drawings.

BRIEF DESCRIPTION OF THE DRAWINGS

FIG. 1 is a perspective view to show respective parts systematically.

FIG. 2 are side views of the frame with a front wall thereof exploded to indicate the order of the shaping procedure.

FIGS. 2A through 2H show cross-sections of the instant invention at different stages of use.

DESCRIPTION OF THE PREFERRED EMBODIMENT

FIG. 1 indicates respective parts of a sushi roll shaping device according to the present invention. Respective parts are made of sanitary materials such as plastics. A frame 11 is a square box which has a hollow inside a. A base of the width insertable into the hollow body a is fixed on the lower side thereof with a stopper member 13 which has a longer size than the said hollow body a. (The stopper member 13 comprises two sticks in this embodiment.) Semi-cylindrical notches 14 in plural and parallel rows are formed on the upper face of the base. The reference numeral 15 denotes a ram member having an outer dimension insertable to the said hollow body a. A handle 16 is projected therefrom on the upper side while plural projections are formed in parallel on the lower side thereof. The number and interval distance of the projections 17 are determined in such a manner that each projection comes to the center of the respective semi-cylindrical notches 14 of the base which is inserted below as the ram member 15 is inserted from above into the frame. A push cover 19 has a handle 18 on the upper side and a width insertable into the hollow body of the frame and provided with notches 20 on the lower side in the parallel arrangement similar to the semi-cylindrical notches 14 of said base 12.

The frame according to the present invention with the construction above mentioned is used in following steps for shaping rice bodies for sushi rolls. As indicated in FIGS. 2A to 2H, the base 12 is first inserted from below into the frame 11 for engagement (FIG. 2A), steamed and vinegared rice 21 in a suitable amount is thrown in the frame hollow body a from above to the one half of the height thereof (FIG. 2B) and the ram member 15 is forced into the frame 11 from above to dent the rice with the projections 17 on the lower side (FIG. 2C). Since the projections 17 are situated at the center of each semicylindrical notch 14 of the base 12, the said denoted portions come to become located at the center of the respective semi-cylindrical notches 14 of the base. Such ingredients as pieces of tuna, ham, cucumber, etc. 22 are placed inside the dents (FIG. 2D) and then more rice is filled into the hollow body a of the frame to the fullest extent (FIG. 2E). The push cover 19 is pushed from above into the frame 11 to press the rice to shape cylindrical forms (FIG. 2F), and then the frame 11 and the cover 19 are removed to finish the process (FIGS. 2G and 2H).

The formed cylindrical rice roll shaped in the above mentioned process is wrapped on the outside with a sheet of roasted seaweed either directly or through a water repellent sheet such as a vinyl sheet if the sushi roll is meant for take-out.

By using the device according to the present invention, it becomes quite easy to shape a presentable sushi roll of a given size and shape and with ingredients properly located at the center inside. This device conveniently enables anyone to shape such superbly finished sushi rolls without necessitating expertise and hence is especially effective for commercial production.

While the present invention has been described and illustrated in conjunction with specific embodiments, it is to be understood that the present invention is by no means limited thereto and covers all changes and modification which will become possible within the scope of the appended claims.

What is claimed is:

1. A rice-body shaping device for a rolled sushi comprising a hollow square frame, a base having a width insertable into the hollow frame which is fixedly provided with a stopper member of a size larger than the said width on the lower side thereof and is provided on the upper side thereof with plural semi-cylindrical notches in parallel arrangement, a ram member having a width insertable into the said hollow member and plural projections provided on the lower side thereof which are arranged at such intervals that, when inserted into the frame, the projections are made to come at the center of the respective semi-cylindrical notches provided on the said base, and a push cover of a width insertable into the said hollow member which is provided on the lower side thereof with notches symmetrical to the said semi-cylindrical notches of the said base.

2. The rice-body shaping device for a rolled sushi as claimed in claim 1 which in further fixed with handles on the upper faces of the ram member and the push cover respectively.

* * * * *